United States Patent Office 3,283,030
Patented Nov. 1, 1966

3,283,030
UNSATURATED POLYESTERS PREPARED BY THE SEQUENTIAL REACTION OF A PHENOL-ALDEHYDE WITH A MONO-OXIRANE OR OTHER HYDROXYETHER FORMING COMPOUND, AND A POLYCARBOXYLIC ACID
Claude Thomas Bean, Jr., Niagara Falls, and Donald H. Thorpe, Williamsville, N.Y., assignors to Hooker Chemical Corporation, Niagara Falls, N.Y., a corporation of New York
No Drawing. Filed Oct. 25, 1962, Ser. No. 233,141
34 Claims. (Cl. 260—842)

This invention relates to novel unsaturated polyester compositions and to processes for producing them. In another aspect, the invention relates to the production of versatile polyester compositions utilizing readily available raw materials.

Many types of polyester resins are in commercial use for a variety of purposes. Increasing competition in this field has caused this search for polyesters with improved properties which can be made from readily available raw materials.

Accordingly, it is an object of this invention to provide novel polyester compositions and a process for producing them. It is another object of the invention to provide unsaturated polyester compositions with improved properties. It is a further object of the invention to provide polyester resins that can be made at low cost with readily available raw materials. It is still another object of the invention to provide unsaturated polyesters that can be cured to thermosetting polymers, and which can be used for making reinforced plastic articles, laminated articles and molded articles of many types. These and other objects of the invention will become apparent upon a consideration of the following specification.

In accordance with this invention, there is provided a thermoplastic polymer that can be obtained by the process comprising the steps of:

(1) Providing a phenol having one to two aralkyl substituents in the ortho- or para-positions of the phenol nucleus, (2) Reacting the substituted phenols with an aldehyde or ketone to form a phenolic condensation product, (3) Reacting the condensation product with a substance reactive with the phenolic hydroxyl groups thereof and selected from the group consisting of monooxirane ring compounds, alkylene halohydrins, alkylene carbonates and mixtures thereof to form a hydroxyether derivative, and (4) Esterifying the hydroxyether derivative with a compound selected from the group consisting of polycarboxylic acids, polycarboxylic acid anhydrides, polycarboxylic acid halides, and mixtures thereof, to produce an unsaturated polyester resin. At least one of the substances reacted with the condensation product must be ethylenically unsaturated and the resulting polyester resin contains at least one isolated addition-polymerizable carbon-to-carbon double bond. The substituted phenols can be provided by alkylating a phenol with an aromatic hydrocarbon having one ethylenically unsaturated hydrocarbon substituent, and hereafter designated the aralkenyl hydrocarbon.

In another aspect of the invention, the thermoplastic polymer is modified by including an aliphatic glycol in the reaction of the hydroxyether derivative and the polycarboxylic compound, so that the aliphatic glycol is incorporated into the thermoplastic polymer.

In still another aspect of the invention, the unsaturated polyester resins of the type described hereinbefore are cured to thermosetting products by cross-linking reactions with a free radical polymerization catalyst, or an ethylenically unsaturated monomer and a free radical polymerization catalyst.

The thermoset resins of the invention are useful for many purposes such as in the production of reinforced and laminated plastic articles, and in the preparation of molded articles.

In the preferred method of providing the phenolic condensation product for use in the preparation of the polymers of this invention, a phenol is alkylated with an aralkenyl hydrocarbon, and the substituted phenol is thereafter condensed with an aldehyde or a ketone to form the phenolic condensation product. Alkylation of the phenolic nucleus occurs in the ortho- and para-positions. Suitable aralkenyl hydrocarbons for providing the required substitution on the phenol rings are compounds having eight to eighteen carbon atoms, such as styrene, halogenated styrenes such as para-chlorostyrene, vinyl toluene, alpha-methyl styrene, and generally any vinyl aromatic compound.

Suitable phenols include phenol itself and phenols having the formula

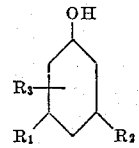

wherein $R_1$ and $R_2$ are each selected from the group consisting of hydrogen, and substantially straight chain aliphatic radicals having one to twenty carbon atoms, and $R_3$ is selected from the group consisting of hydrogen, alkyl groups of one to twenty carbon atoms in any of their isomeric forms, alicyclic groups of five to eighteen carbon atoms such as cyclohexyl, cyclopentyl, methyl cyclohexyl, butyl cyclohexyl, and the like; aryl groups of six to eighteen carbon atoms, such as phenyl, cumyl, tolyl, and the like; and aralkyl groups of seven to eighteen carbon atoms such as alpha-methyl benzyl, alpha-methyl tolyl, benzyl, and the like. Typical meta-substituted phenols are meta-cresol, meta-xylenol, 3,5-diethyl phenol, 3-methyl-5-ethyl phenol, as well as phenols having long chain substituents in the meta-position, such as cashew nut shell oil. Suitable ortho- and para-substituted phenols include: para-tertiary-butylphenol, para-secondary-butylphenol, para-tertiary hexylphenol, para-isooctyl-phenol, para-phenylphenol, para-benzylphenol, para-alpha-methyl benzylphenol, para-alpha-methyl tolylphenol, para-cyclohexylphenol, para-decyl-phenol, para-dodecyl-phenol, para-tetra-decyl-phenol, para-octa-decyl-phenol, para-nonyl-phenol, para-methyl-phenol, para-beta-naphthyl-phenol, para-alpha-naphthyl-phenol, para-pentadecyl-phenol, para-cetyl-phenol, para-cumyl phenol, para-hydroxy acetophenone, para-hydroxy benzophenone, a phenol alkylated with limonene, a phenol alkylated with oleic acid, as well as the corresponding ortho-derivatives such as ortho-butyl phenol and ortho-decyl phenol, as well as mixtures thereof. Also contemplated are mixed ortho-meta- derivatives, para-meta- derivatives such as 4,5-diethylphenol, 4-methyl-5-ethylphenol, 2,5-diethylphenol, 4-octyl-5-ethylphenol and the like.

It is usual to employ from about one to two moles of the aralkenyl hydrocarbon per mole of the phenol, and preferably about 1.5 to about two moles per mole, although variation in the ratio is possible. An average of one position on the phenol nucleus that is reactive with formaldehyde should be present in the crude substituted phenol mixture. It is also preferred to use a catalyst such as phosphoric acid, sulfuric acid or boron trifluoride in an amount from about 0.01 to one weight percent based on the weight of the phenol. The aralkenyl hydrocarbon is added to the phenol at a temperature of about 40 to 150 degrees centigrade, preferably 70 to 100 degrees centigrade, and the reaction temperature is preferably maintained in the range of about 100 to 200 degrees centigrade, more preferably not greater than 150 degrees centigrade. The completion of the reaction is observed by refractive index determinations. The reaction product is generally a mixture of phenols that are mono-, di- and tri-alkylated in the ortho- and para-positions and preferably contains at least about 50 weight percent of such di-alkylated phenol. This crude mixture of substituted phenols is preferably employed in the preparation of the polymers of the invention. However the mixture can be separated, as by distillation, into component parts which can be used in subsequent steps described hereinafter. Hence, if desired, the phenols that are di-alkylated in the ortho- and/or para-positions can be separated and employed in the condensation reaction with an aledhyde or ketone. Such "di-alkylated" phenols have the formula:

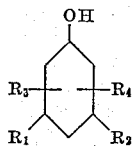

wherein $R_4$ is an aralkyl hydrocarbon radical having eight to eighteen carbon atoms, and $R_1$, $R_2$, and $R_3$ have the same values indicated hereinbefore, except that $R_3$ would no longer be hydrogen. Also, if the $R_3$ group is an aralkyl radical provided by the alkylation step of this invention, it will contain at least eight carbon atoms.

In the condensation of the substituted phenols to provide the phenolic condensation product, any suitable aldehyde or mixtures of aldehyde, capable of reacting with the phenol and having up to about eight carbon atoms is satisfactory provided it does not contain a functional group or structure detrimental to the condensation reaction or to esterification or oxyalkylation of the condensation product. The preferred aldehyde is formaldehyde, which can be in an aqueous solution, or any of its low polymeric forms such as paraform or trioxane. Other examples of aldehydes include acetaldehyde, propionaldehyde, butyraldehyde, benzaldehyde, furfuraldehyde, 2-ethylhexanal, ethylbutyraldehyde, heptaldehyde, and the like. The condensation of the substituted phenols can also be carried out using an aliphatic ketone having from three to eight carbon atoms. Such ketones are acetone, methylethyl ketone, diethylketone, ethylpropyl ketone, dipropyl ketone, propylbutyl ketone; as well as cycloaliphatic ketones having five to eight carbon atoms, such as cyclopentanone, cyclohexanone and cyclooctanone.

The condensation reatcion is preferably carried out in the presence of an acid catalyst such as oxalic acid, maleic acid, hydrochloric acid, sulfuric acid, and the like. However, basic catalysts such as ammonia, amines and quaternary ammonium bases can also be used. The ratio of aldehyde to phenol is preferably in the range of 0.5 to 0.85. The condensation reaction is usually carried out at the atmospheric reflux temperature of the reactants, although super-atmospheric pressure can be employed if desired. The reaction product, designated herein as the phenolic condensation product, is a mixture of mono-, di-, and polyhydroxy compounds but is predominantly dihydroxy. However, it is this mixture that contributes to the valuable properties of the ultimate polyester resin.

The phenolic condensation product for use in the invention can also be prepared by alkylation of a mixture of unsubstituted phenols, bisphenols, and other phenol-aldehyde condensation products with an aralkenyl hydrocarbon of the type described hereinbefore.

In preparing the polymers of the instant invention, the phenolic condensation product is first reacted with a compound such as a monooxirane ring compound, an alkylene halohydrin, or an alklene carbonate. The resulting composition is designated herein as the hydroxyether derivative. When the phenol condensation product is prepared from a mixture of mono-, di-, and tri-alkylated phenols, there results a mixture of monohydric, dihydric, and polyhydric ether derivatives.

The preferred method of hydroxyalkylation is by reaction with compounds containing a monooxirane ring. Such compunds include ethylene, propylene, butylene, styrene and cyclohexene oxides, and epichlorohydrin. Many other monoepoxides can be used, but the alkylene oxides containing up to six carbons are generally used. Additional useful compounds are phenyl glycidyl ether and related compounds prepared from the reaction of epichlorohydrin and monofunctional alkylated and halogenated phenols such as pentachlorophenyl glycidyl ether.

Catalysts for the reaction of the oxirane ring compounds and phenolic hydroxyl groups are alkali or alkaline earth hydroxides, primary amines, secondary amines, tertiary amines, or basic alkali salts. These include sodium, potassium, lithium, calcium and barium hydroxides, amines such as methyl, dimethyl, diethyl, trimethyl, triethyl, tripropyl, dimethyl benzyl, dimethyl hydroxyethyl, dimethyl-2-hydroxypropyl and the like, and salts of strong bases and weak acids such as sodium acetate or benzoate. The reaction can be carried out at temperatures of fifty to two hundred and fifty degrees centigrade, and preferably in the absense of solvents, although solvents can be used.

The phenolic hydroxyl of the phenolic condensation product can also be hydroxyalkylated by reacting alkylene halohydrins with the phenolic hydroxyl using equivalent amounts of an alkali metal hydroxide to bring about the reaction. Suitable alkylene halohydrins are ethylene chloro or bromo-hydrins, propylene chloro or bromo-hydrins, 2,4-butylene chloro or bromo-hydrins, glyceryl chloro or bromo-hydrins.

Another method for hydroxyalkylating the phenolic condensation product is reaction with alkylene carbonates such as ethylene carbonate and propylene carbonate, using a catalyst such as potassium carbonate.

It is preferred that the phenolic condensation product be reacted until substantially all of the reactive phenolic hydroxyl groups have reacted (leaving preferably less than 0.5 percent of the phenolic hydroxyls unreacted). This is desirable to prevent inhibition of the reaction of monomers and to give oxidation and light stability in the resultant product. At least one mole of alkylene oxide or other etherifying agent is required per mole of phenolic hydroxyl. However, resins prepared by reaction with up to three mols of alkylene oxide per mole of phenolic hydroxyl are useful.

A variety of polycarboxylic acids, acid halides, acid anhydrides, or mixtures thereof can be used for reaction with the hydroxyether derivative such as prepared in accordance with the invention. For example, the hydroxy-alkylated products can be esterified with an alpha, beta-unsaturated dicarboxylic acid or anhydride. Suitable dicarboxylic acids and the corresponding acid chlorides and acid anhydrides include maleic, chloromaleic, ethylmaleic, itaconic, citraconic, xeronic, and pyrocinchoninic, either alone or as a mixture. The resins can be modified for special properties by using polycarboxylic acids and anhydrides which are not alpha, beta-unsaturated along with the above-mentioned acids, anhydrides and acid halides. For example, 1,4,5,6,7,7-hexachlorobicyclo - (2.2.1) - 5 - heptene - 2,3 - dicarboxylic acid and anhydride and tetrachlorophthalic anhydride impart flame resistance. Examples of other useful acids, acid chlorides and anhydrides include phthalic, tetrahydrophthalic, cyclopentadiene and methyl cyclopentadiene-maleic adducts, succinic, tricarballylic, glutonic, dodecyl succinic, glutaric, adipic, pimellic, suberic, azaleic, sebacic, and the like.

The esterification of hydroxyether derivative is preferably carried out at a temperature in the range of about 150 to 220 degrees centigrade although higher temperatures can be used. Under the conditions employed in the polyesterification reaction, the final acid number of polyesters is reduced at least to the range of 20 to 40, and preferably the acid number is reduced to the range of 10 to 20. It is surprising to find that the esterification can be carried out without gellation even when reacting to an acid number of 10, when it is considered that the hydroxyether derivative generally contains trifunctional molecules, as well as some monohydroxy compounds, in addition to the predominantly dihydroxy compounds.

The progress of the esterification reaction can be monitored by measuring the quantity of water of esterification that is produced. Small quantities of toluene or xylene can be used as azeotroping agents to facilitate removal of the water. When acid chlorides are used, it is preferred to use solvents during the reaction. The acid chloride can be dissolved in a suitable solvent such as benzene and methylene dichloride and added to the hydroxyether derivative also dissolved in the same or a similar solvent. The reaction can be conducted at a temperature up to the boiling point of the solvent. The solvent can be readily removed such as by stripping at the completion of the reaction. The progress of the reactions involving the acid chlorides can be monitored by measuring the quantity of hydrogen chloride evolved during the course of the esterification. Moreover, in the reactions involving the acid chlorides, it is advantageous to use a hydrogen halide acceptor such as amines and strong bases. Preferred acceptors are tertiary amines such as pyridines and triethylamine.

The properties of the unsaturated polyester resins of the invention can be advantageously modified by incorporating in the esterification reaction mixture a quantity of an alkylene glycol having 2 to 16 carbon atoms per molecule. By the term alkylene glycol we include the well-known polyalkylene ether glycols. Suitable compounds are ethylene, diethylene, triethylene and tetraethylene glycols; trimethylene glycol; propylene, dipropylene and tripropylene glycols; butylene glycols; pentylene glycols; neopentyl glycol; 2 - methyl - 2 - ethyl propanediol - 1,3; 2,2 - diethyl propanediol - 1,3; 2,2,4,4 - tetramethyl cyclobutanediol-1,3; and bis (1,4 - hydroxymethyl) cyclohexane. The advantageous effects of using the aliphatic glycols will be demonstrated in the examples presented hereinafter. In the polyester resins of the invention, the amount of alkylene glycol employed can vary up to a ratio of five moles of alkylene moles of alkylene glycol to a mole of hydroxyether derivative. Generally, the ratio is in the range of 0.3 to 10 moles of alkylene glycol to mole of hydroxyether derivative and preferably is 1 to 4 moles per mole.

The resultant ethylenic polymer can be cured by crosslinking in the presence of a catalytic amount of a conventional polymerization catalyst for addition polymerization of ethylenically unsaturated materials, including free radical catalysts such as benzoyl peroxide, and other organic peroxides. The polymer can also be cured by copolymerization with an ethylenically unsaturated monomeric material copolymerizable therewith, and preferably in the presence of a catalytic amount of a polymerization catalyst such as mentioned above.

The ethylenically unsaturated monomers which can be used in curing or cross-linking the ethylenically unsaturated polymers of the persent invention may be varied widely. While other materials may be used, it is preferred that addition polymerization be practiced since no by-product ammonia, water, etc., is formed and the problems resulting therefrom are not experienced. The monomers useful in curing the thermoplastic unsaturated polymers include vinylidene compounds or mixtures thereof capable of cross-linking ethylenically unsaturated polymer chains at their points of unsaturation and usually they contain the reactive group $H_2C=C<$. Specific examples include styrene, chlorostyrenes, methyl styrenes such as alphamethyl styrene, p-methyl styrene, divinyl benzene, indene, unsaturated esters such as: methyl methacrylate, methyl acrylate, allyl acetate, vinyl acetate, diallyl phthalate, diallyl succinate, diallyl adipate, diallyl sebacate, diethylene glycol bis (allyl carbonate), triallyl phosphate, diallyl benzene phosphonate, and vinyl toluene, diallyl chlorendate, diallyl tetrachlorophthalate, the lower aliphatic esters other than methyl or methacrylic and acrylic acids, etheylene glycol diacrylate, dimethacrylate, diethacrylate, etc. The monomer can be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

In accordance with still other aspects of the invention, it is possible to employ the improved polymers of the invention in the preparation of plastic articles in general, reinforced plastic articles containing a reinforcement such as cloth, glass fibers in the form of roving individual glass fibers, etc., and laminates or other filled resin compositions. Surprisingly, such prepared materials exhibit vastly improved physical properties such as discussed above for the polymers of the invention. Suitable reinforcements or laminations for preparaing the reinforced articles and laminates include textile fibers, glass fibers or cloth, roving, etc. Castings may be prepared from the improved polymers of the present invention and such products likewise have been found to exhibit the improved properties of the polymers discussed above to a surprising degree. In general, well-known processes of the prior art can be used for preparing the above-mentioned plastic articles, reinforced plastic articles, laminates or other filled resin compositions, and castings, with the exception of substituting the improved polymer of the invention for that conventionally used. Usually, other changes in the process are not necessary. It is usually preferred that a thermoset polymer be present in the finished article.

The following are examples of suitable reinforcing media that can be used with the polymers of the invention: glass fibers, glass mats, glass cloth, synthetic fibers such as orlon, mineral fibers such as asbestos, natural fibers such as cotton, silk and wool, and metallic fibers such as aluminum and steel.

Following are examples of fillers that can be used in the polymers of the invention: inorganic materials such as calcium carbonate, clay and pigments, and organic materials such as wood flour, cotton and ray flock, sisal fibers and dyes.

The foregoing detailed description and the following specific examples are for purposes of illustration only, and are not intended as limiting the spirit or scope of the invention.

The following Examples 1 and 2 illustrate the method for preparing the hydroxyether derivatives used in the invention.

*Example 1*

Into a reactor is charged 1410 parts of phenol and 1.41 parts of concentrated sulfuric acid. The mixture is heated to 70 degrees centigrade, and 3120 parts of styrene are added. The reaction mixture is permitted to heat up to 150 degrees centigrade and is maintained at that temperature. Within one-half hour after the styrene is added, the refractive index at 25 degrees centigrade of the mixture levels off at a value in the range of 1.599 to 1.601. A typical anlysis of the styrenated phenol is as follows:

| | Mole percent |
|---|---|
| Tri-styryl phenol | 17.4 |
| Di-styryl phenol | 56.5 |
| Mono-styryl phenol | 23.1 |
| Phenol | 2.95 |

The styrenated phenol is cooled to 100 degrees centigrade and then there is added 22.5 parts of oxalic acid and 9.0 parts of a sodium aralkyl sulfonate wetting agent. To the mixture is then added slowly 605 parts of 37 percent formaldehyde, and the mixture is refluxed for about one hour to provide for reaction in the formaldehyde. The resulting phenolic condensation product is dehydrated by heating up to a temperature of 180 degrees centigrade at 35 mm. pressure. The condensation product is cooled to 120 to 140 degrees centigrade, and 57 parts of sodium methylate is added. Thereafter, 696 parts of propylene oxide are pumped slowly into the reaction mixture, and reaction is continued until the reaction product is substantially free of phenolic hydroxyl groups, that is, less than 0.5 percent phenolic hydroxyl. The product has a hydroxyl number of 151.

*Example 2*

To the phenolic condensation product of Example 1 is added 47 parts of sodium methylate as catalyst and then 774 parts of ethylene oxide is slowly pumped in and reacted until the product is substantially free of phenolic hydroxyl groups. The product has a hydroxyl number of 159.

The following Examples 3 to 5 illustrate the preparation of unsaturated polyester resins in accordance with the invention:

*Example 3*

A reactor equipped with an agitator, an inert gas feed line, and a condenser for removing water is charged with 744 parts of the hydroxyether derivative of Example 1, 98 parts of maleic anhydride, and 0.125 part of hydroquinone. The temperature is raised to 200 degrees centigrade, and maintained until the resulting resin has an acid number of 20. The resin has a melting point of 57 to 67 degrees centigrade.

*Example 4*

An agitated reactor equipped with a condenser for removing water is charged with 744 parts of the hydroxyether derivative of Example 1, 76 parts of propylene glycol, 196 parts of maleic anhydride, and 0.10 part of hydroquinone. The resin is reacted to an acid number of 25, and has a melting point of 59 to 68 degrees centigrade.

*Example 5*

Using an agitated reactor equipped with a condenser for removing water, there is reacted 2112 parts of the hydroxyether derivative of Example 2, 464 parts of fumaric acid, 76 parts of propylene glycol, and .24 part of hydroquinone. The temperature is raised to 200 degrees centigrade, and maintained until the resulting resin has an acid number of 25. The resin had a melting point of 58 to 68 degrees centigrade.

The following examples show the preparation of crosslinked thermosetting resins in accordance with the invention.

*Example 6*

100 parts of the polyester resin of Example 3 is mixed with 53 parts of vinyl toluene. Then, 35 parts of the resulting mixture, 0.35 part of tertiary butyl perbenzoate, 28.85 parts of calcium carbonate, 10 parts of asbestos, 25 parts of ¼" glass fibers, and 0.8 part of zinc stearate, are mixed in a Sigma Blade Mixer. The premix dough compound is molded in a press at 320 degrees Fahrenheit for two minutes. The molded pieces have a flexural strength of 13,500 p.s.i. and an impact strength of 5.2 ft. lbs./in.

*Example 7*

The polyester resin of Example 4 is mixed with 55 parts of vinyl toluene and is made into a premix dough compound and molded as described in Example 6. The molded pieces have a flexural strength of 4,000 p.s.i. an impact strength of 4.5 ft. lbs./in.

In the following Examples 8 to 38, additional resins are prepared in accordance with the invention, and following the procedures outlined in the foregoing examples. Additionally, certain of the polyester resins are used to prepare glass cloth laminates to further demonstrate the utility of the invention. In the preparation of these laminates, the mixture of unsaturated polyester resin and unsaturated monomer are catalyzed with 1 percent benzoyl peroxide and applied to 12 plies of No. 181 glass cloth. The molding conditions are ten minutes at 80 degrees centigrade, and twenty minutes at 125 degrees centigrade, all at 25 p.s.i. The proportions of reactants used to prepare the resins and the properties of the resulting resins are shown in Table I.

TABLE I

| Example No. | Hydroxyether Derivative | | Alkylation Agent | Unsaturated Polyester Resin | | | | | |
|---|---|---|---|---|---|---|---|---|---|
| | Aromatic Substituent | Mole Per Mol Phenol | | Mols Ether Derivative | Alkylene Glycol | Moles | Carboxylic Acid | Moles | Acid No. |
| 8 | Styrene | 2 | Propylene oxide | 1.0 | | | Maleic acid | 1.0 | 16.5 |
| 9 | do | 2 | do | 2.0 | Propylene glycol | 1.0 | do | 3.0 | 22.6 |
| 10 | do | 2 | do | 2.0 | do | 1.0 | Fumaric acid | 3.0 | 23.2 |
| 11 | do | 2 | do | 3.0 | do | 1.0 | Maleic acid | 4.0 | 16.7 |
| 12 | do | 2 | do | 1.0 | do | 1.0 | do | 1.0 | 14.6 |
| 13 | do | 2 | do | 1.0 | do | 1.0 | do | 2.0 | 27.0 |
| 14 | do | 2 | do | 1.0 | do | 2.8 | do | 3.8 | 18.7 |
| 15 | do | 2 | do | 1.0 | do | 1.2 | do | 2.2 | 24.8 |
| 16 | do | 2 | do | 1.0 | Dipropylene glycol | 1.0 | do | 2.0 | 20.3 |
| 17 | do | 2 | do | 3.0 | do | 2.0 | do | 5.0 | 28.0 |
| 18 | do | 2 | do | 1.0 | Diethylene glycol | 1.0 | do | 2.0 | 17.3 |
| 19 | do | 2 | Ethylene oxide | 2.0 | Propylene glycol | 1.0 | do | 3.0 | 14.4 |
| 20 | do | 2 | do | 2.0 | do | 1.0 | do | 3.0 | 14.4 |
| 21 | do | 2 | do | 1.0 | do | 1.0 | do | 2.0 | 11.2 |
| 22 | do | 2 | do | 1.0 | do | 1.0 | do | 2.0 | 28.1 |
| 23 | do | 2 | do | 1.0 | do | 2.7 | do | 3.7 | 35.6 |
| 24 | do | 2 | do | 1.0 | do | 2.7 | do | 3.7 | 36.3 |
| 25 | do | 2 | do | 1.0 | Dipropylene glycol | 1.0 | do | 2.0 | 25.6 |
| 26 | do | 2 | do | 1.0 | do | 1.0 | do | 2.0 | 23.6 |
| 27 | do | 2 | do | 1.0 | Diethylene glycol | 1.0 | do | 2.0 | 15.5 |
| 28 | do | 1.5 | Propylene oxide | 2.0 | Propylene glycol | 1.0 | do | 3.0 | 33.4 |
| 29 | do | 1 | do | 2.0 | do | 1.0 | do | 3.0 | 49.5 |
| 30 | do | 1 | do | 1.0 | | | do | 1.0 | 47.4 |
| 31 | do | 1 | do | 2.0 | Dipropylene glycol | 1.0 | do | 3.0 | 61.2 |
| 32 | Vinyl toluene | 2 | do | 1.0 | Propylene glycol | 1.0 | do | 2.0 | 26.8 |
| 33 | do | 2 | Butylene oxide | 1.0 | do | 1.0 | Itaconic acid | 2.0 | 24.0 |
| 34 | α-methyl styrene | 2 | do | 1.0 | do | 1.0 | Fumaric acid | 2.0 | 27.0 |
| 35 | Styrene | 2 | Stryene oxide | 1.0 | do | 1.0 | Chloromaleic acid | 2.0 | 25.0 |
| 36 | do | 2 | Ethylene chlorohydrin | 1.0 | Tripropylene glycol | 1.0 | Maleic acid | 2.0 | 31.0 |
| 37 | do | 2 | Ethylene carbonate | 1.0 | do | 1.0 | do | 2.0 | 30.0 |
| 38 | do | 2 | Propylene carbonate | 1.0 | Diethylene glycol | 1.0 | do | 2.0 | 28.0 |
| 39 | Tripropylene | 2 | Propylene oxide | 1.0 | Propylene glycol | 2.0 | do | 3.0 | 25.9 |
| 40 | Isobutylene | 2 | do | 3.0 | do | 2.0 | do | 5.0 | 25.2 |

TABLE I.—Continued

| Example No. | Polymerizable Composition | | SPI Gel* Properties | | | Heat Distortion Temp.,° C. | Laminate Properties | |
|---|---|---|---|---|---|---|---|---|
| | Unsaturated Monomer | Parts Monomer, 100 Parts Resin | Gel Time, Min. | Peak Exotherm Temp.,° C. | Time to Peak | | Flexural Strength, p.s.i. | Flexural Modulus, p.s.i. ×10 |
| 8 | Vinyl toluene | 53 | 4.5 | 105 | 11.0 | | | |
| 9 | do | 50 | 3.3 | 133 | 6.2 | | | |
| 10 | do | 55 | 3.8 | 140 | 7.1 | 64 | 41,230 | 3.07 |
| 11 | do | 55 | 4.0 | 123 | 9.2 | | | |
| 12 | Styrene | 55 | 3.4 | 171 | 5.9 | 78 | 64,290 | 3.69 |
| 13 | Vinyl toluene | 57 | 3.5 | 168 | 5.8 | | | |
| 14 | Styrene | 50 | 3.4 | 201 | 5.1 | 100 | 66,060 | 3.66 |
| 15 | do | 73 | 4.3 | 175 | 7.6 | 94 | | |
| 16 | do | 50 | 5.0 | 159 | 8.0 | 79 | 65,660 | 3.36 |
| 17 | Vinyl toluene | 50 | 4.3 | 138 | 7.8 | | | |
| 18 | Styrene | 53 | 4.4 | 177 | 6.6 | 75 | 74,440 | 3.74 |
| 19 | do | 50 | 3.5 | 156 | 5.7 | 75 | 58,020 | 3.11 |
| 20 | Vinyl toluene | 55 | 3.3 | 150 | 5.3 | 69 | 54,020 | 3.05 |
| 21 | Styrene | 45 | 3.4 | 166 | 5.6 | 76 | | |
| 22 | Vinyl toluene | 60 | 4.1 | 179 | 6.5 | 72 | 59,450 | 3.31 |
| 23 | Styrene | 49 | 3.5 | 201 | 5.0 | 104 | 62,200 | 3.29 |
| 24 | Vinyl toluene | 50 | 2.8 | 194 | 4.2 | 94 | | |
| 25 | do | 57 | 3.4 | 163 | 5.3 | 61 | | |
| 26 | Styrene | 45 | 3.5 | 161 | 5.8 | 60 | 63,530 | 3.28 |
| 27 | do | 57 | 5.5 | 161 | 7.9 | 65 | 63,400 | 3.67 |
| 28 | Vinyl toluene | 67 | 4.3 | 172 | 6.9 | 77 | | |
| 29 | do | 72 | | | | | | |
| 30 | do | 65 | | | | | | |
| 31 | Styrene | 60 | 5.6 | 188 | 8.3 | | | |
| 32 | do | 50 | 3.9 | 152 | 6.7 | 75 | 56,610 | 3.10 |
| 33 | do | 53 | 5.0 | 148 | 7.5 | 80 | | |
| 34 | do | 55 | 5.5 | 188 | 8.3 | 85 | | |
| 35 | Vinyl acetate | 50 | | | | | | |
| 36 | Styrene | 49 | 4.7 | 185 | 7.3 | 65 | | |
| 37 | do | 49 | 4.8 | 186 | 7.5 | 70 | | |
| 38 | do | 50 | 4.5 | 180 | 6.8 | 73 | 70,000 | |
| 39 | do | 40 | 13.0 | 93 | 19.4 | 49 | | |
| 40 | do | 47 | 35.0+ | | | 63 | | |

*SPI gel properties determined in accordance with procedure set forth in Preprint Book, 16th Annual Technical and Management Conference, Reinforced Plastics Division, Society of Plastics Industry, February 1961.

The foregoing examples show that the polymers of the invention have an excellent balance of properties. This is especially apparent when these properties are compared with those of resins wherein the phenolic nuclei are alkylated with aliphatic substituents such as in Examples 39 and 40.

The polymers of the invention are seen to have good heat distortion temperatures. They have low "gel times," which is the determination of the amount of time required for the heat of reaction to raise the temperature of the polymerizable mix from 65.5 to 87.9 degrees centigrade when maintained in a water bath at 82.2 degrees centigrade. The fact that the polymers have short "gel times" indicates that they cure rapidly which has obvious commerical advantages. Likewise, this is also reflected in the short amount of time the resins required to reach the peak exotherm temperature during the same test.

Generally the term "ethylenic unsaturation" has been used in the specification to refer to compositions containing aliphatic carbon-to-carbon double bonds. Many operating details and preferred ranges have been incorporated into this specification to provide a full disclosure of the invention. But many other variations and modifications of this invention can be envisioned by those skilled in the art without departing from the spirit and essential characteristics thereof. Accordingly, the foregoing specification is intended to illustrate the invention, but does not restrict it.

In the foregoing specification, all quantities are understood to be in parts by weight, unless indicated otherwise.

We claim:
1. An unsaturated polyester resin obtained by the process which comprises the steps of:
    (1) reacting a phenol having the formula:

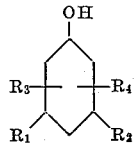

wherein $R_1$ and $R_2$ are each selected from the group consisting of hydrogen, and substantially straight chain aliphatic radicals, $R_3$ is selected from the group consisting of alkyl, alicyclic, aryl and aralyl groups, and $R_4$ is an aralkyl group, with a compound selected from the group consisting of aldehydes and ketones to form a phenolic condensation product, employing a ratio of up to 0.85 mole of aldehyde or ketone per mole of phenol,
    (2) reacting the phenolic condensation product with a substance reactive with the phenolic hydroxyl groups thereof, and selected from the group consisting of a monooxirane ring compound, an alkylene halohydrin, an alkylene carbonate, and mixtures thereof to form a hydroxyether derivative, and
    (3) esterifying the hydroxyether derivature by reacting it with a polycarboxylic compound selected from the group consisting of polycarboxylic acids, polycarboxylic acid anhydrides, polycarboxylic acid halides, and mixtures thereof to produce an unsaturated polyester resin, at least one polycarboxylic compound being ethylenically unsaturated;
the resulting polyester resin containing at least one isolated addition-polymerizable carbon-to-carbon double bond.

2. An unsaturated polyester resin obtained by the process which comprises the steps of:
    (1) alkylating phenol with an aromatic hydrocarbon having at least one ethylenically unsaturated hydrocarbon substituent to provide a product containing a di-alkylated phenol.
    (2) reacting the resulting substituted phenols with formaldehyde to form a phenolic condensation product employing a ratio of up to 0.85 mole of formaldehyde per mole of substituted phenol.
    (3) reacting the phenolic condensation product with an alkylene oxide to form a hydroxyether derivative and,
    (4) esterifying the hydroxyether derivative by reacting with a polycarboxylic compound selected from the group consisting of polycarboxylic acids, polycarboxylic acid anhydrides, polycarboxylic acid halides, and mixtures thereof, at least one polycarboxylic compound being ethylenically unsaturated; the resulting polyester resin containing at least one isolated addition-polymerizable carbon-to-carbon double bond.

3. The composition of claim 2 wherein the alkylene oxide is ethylene oxide.

4. The composition of claim 2 wherein the alkylene oxide is propylene oxide.

5. The composition of claim 2 wherein the aromatic hydrocarbon is styrene.

6. The composition of claim 2 wherein the aromatic hydrocarbon is vinyl toluene.

7. The composition of claim 2 wherein the polycarboxylic acid is maleic acid.

8. The composition of claim 2 wherein the polycarboxylic acid is fumaric acid.

9. The unsaturated polyester resin obtained by the process which comprises the steps:
(1) alkylating phenol with an aromatic hydrocarbon having at least one ethylenically unsaturated hydrocarbon substituent to provide a product containing a di-alkylated phenol,
(2) reacting the resulting substituted phenols with formaldehyde to form a phenolic condensation product, employing a ratio of up to 0.85 mole of formaldehyde per mole of substituted phenol,
(3) reacting the phenolic condensation product with an alkylene oxide to form a hydroxyether derivative, and
(4) esterifying the hydroxyether derivative by reacting said derivative and an alkylene glycol with a polycarboxylic compound selected from the group consisting of polycarboxylic acids, polycarboxylic acid anhydrides, polycarboxylic acid halides, and mixtures thereof, at least one polycarboxylic compound being ethylenically unsaturated the resulting polyester resin containing at least one isolated addition-polymerizable carbon-to-carbon double bond.

10. The composition of claim 9 wherein the alkylene glycol is propylene glycol.

11. The composition of claim 9 wherein the alkylene glycol is diethylene glycol.

12. The composition of claim 9 wherein the alkylene glycol is dipropylene glycol.

13. The thermoset polymer obtained by the process comprising mixing a catalytic amount of a free radical polymerization catalyst with an unsaturated polyester, and polymerizing the resulting mixture to produce a thermoset polymer; the unsaturated polyester being prepared by a process which comprises the steps of:
(1) reacting a phenol having the formula:

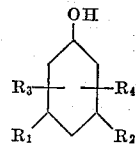

wherein $R_1$ and $R_2$ are each selected from the group consisting of hydrogen, and substantially straight chain aliphatic radicals, $R_3$ is selected from the group consisting of alkyl, alicyclic, aryl and aralkyl groups and $R_4$ is an aralkyl group, with a compound selected from the group consisting of aldehydes and ketones to form a phenolic condensation product, employing a ratio of up to 0.85 mole of aldehyde or ketone per mole of phenol,
(2) reacting the phenolic condensation product with a substance reactive with the phenolic hydroxyl groups thereof, and selected from the group consisting of a monooxirane ring compound, and alkylene halohydrin, an alkylene carbonate, and mixtures thereof to form a hydroxyether derivative, and
(3) esterifying the hydroxyether derivative by reacting it with a polycarboxylic compound selected from the group consisting of polycarboxylic acids, polycarboxylic acid anhydrides, polycarboxylic acid halides, and mixtures thereof, to produce an unsaturated polyester resin, at least one polycarboxylic compound being ethylenically unsaturated, the resulting polyester resin containing at least one isolated addition-polymerizable carbon-to-carbon double bond.

14. A thermoset polymer obtained by the process comprising mixing an unsaturated polyester resin, a catalytic amount of a free radical polymerization catalyst, and an ethylenically unsaturated monomer in an amount to produce a thermoset polymer, and polymerizing the resulting mixture to produce a thermoset polymer; the unsaturated polyester being produced by the process comprising the steps:
(1) alkylating phenol with an aromatic hydrocarbon having at least one ethylenically unsaturated hydrocarbon substituent to provide a product containing a dialkylated phenol,
(2) reacting the resulting substituted phenols with formaldehyde to form a phenolic condensation product, employing a ratio of up to 0.85 mole of formaldehyde per mole of substituted phenol,
(3) reacting the phenolic condensation product with an alkylene oxide to form a hydroxyether derivative, and
(4) esterfying the hydroxyether group by reacting with a polycarboxylic compound selected from the group consisting of polycarboxylic acids, polycarboxylic acid anhydrides, polycarboxylic acid halides, and mixtures thereof, at least one polycarboxylic compound being ethylenically unsaturated; the resulting polyester resin containing at least one isolated addition-polymerizable carbon-to-carbon double bond.

15. The composition of claim 14 wherein the unsaturated monomer is styrene.

16. A plastic article comprising a thermoset polymer of claim 14.

17. A reinforced plastic article comprising a thermoset polymer of claim 14 and a reinforcing medium therefor.

18. A laminated article comprising a plurality of reinforcing medium, and as a binder therefor, a thermoset polymer of claim 14.

19. A molded article comprising a thermoset polymer of claim 14.

20. A thermoset polymer obtained by the process comprising mixing an unsaturated polyester resin, a catalytic amount of a free radical polymerization catalyst, and an ethylenically unsaturated monomer copolymerizable therewith in an amount to produce a thermoset polymer, and polymerizing the mixture to produce a thermoset polymer; the unsaturated polyester resin being produced by the process comprising the steps:
(1) alkylating phenol with an aromatic hydrocarbon having at least one ethylenically unsaturated hydrocarbon substituent to provide a product containing a di-alkylated phenol,
(2) reacting the resulting substituted phenols with formaldehyde to form a phenolic condensation product, employing a ratio of up to 0.85 mole of formaldehyde per mole of substituted phenol,
(3) reacting the phenolic condensation product with an alkylene oxide to form a hydroxyether derivative, and
(4) esterifying the hydroxyether derivative by reacting said derivative in an alkylene glycol with a polycarboxylic compound selected from the group consisting of polycarboxylic acids, polycarboxylic acid anhydrides, polycarboxylic acid halides, and mixtures thereof, at least one polycarboxylic compound being ethylenically unsaturated; the resulting polyester resin containing at least one isolated addition-polymerizable carbon-to-carbon double bond.

21. The composition of claim 20 wherein the unsaturated monomer is styrene.

22. A plastic article comprising the thermoset polymer of claim 20.

23. A reinforced plastic article comprising the thermoset polymer of claim 20 and a reinforcing medium therefor.

24. A laminated article comprising a plurality of layers of reinforcing medium and as a binder therefor the thermoset polymer of claim 20.

25. A molded article comprising the thermoset polymer of claim 20.

26. A polymerizable composition of matter comprising an unsaturated polyester resin and an ethylenically unsaturated monomer copolymerizable therewith; said unsaturated polyester being prepared by the process comprising the steps of:

(1) reacting a phenol having the formula:

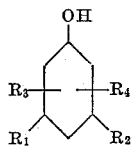

wherein $R_1$ and $R_2$ are each selected from the group consisting of hydrogen, and substantially straight chain aliphatic radicals, $R_3$ is selected from the group consisting of alkyl, alicyclic, aryl and aralkyl groups, and $R_4$ is an aralkyl group, with a compound selected from the group consisting of aldehydes and ketones to form a phenolic condensation product, employing a ratio of up to 0.85 mole of aldehyde or ketone per mole of phenol, (2) reacting the phenolic condensation product with a substance reactive with the phenolic hydroxyl groups thereof, and selected from the group consisting of a monooxirane ring compound, an alkylene halohydrin, an alkylene carbonate, and mixtures thereof to form a hydroxyether derivative, and (3) esterifying the hydroxyether derivative by reacting it with a polycarboxylic compound selected from the group consisting of polycarboxylic acids, polycarboxylic acid anhydrides, polycarboxylic acid halides, and mixtures thereof, to produce an unsaturated polyester resin, at least one polycarboxylic compound being ethylenically unsaturated, the resulting polyester resin containing at least one isolated addition-polymerizable carbon-to-carbon double bond.

27. A polymerizable composition of matter comprising an unsaturated polyester resin and an ethylenically unsaturated monomer copolymerizable therewith said unsaturated polyester resin being prepared by a process comprising the steps of:

(1) alkylating phenol with an aromatic hydrocarbon having at least one ethylenically unsaturated hydrocarbon substituent to provide a product containing a di-alkylated phenol, (2) reacting the resulting substituted phenols with formaldehyde to form a phenolic condensation product, employing a ratio of up to 0.85 mole of formaldehyde per mole of substituted phenol, (3) reacting the phenolic condensation product with an alkylene oxide to form a hydroxyether derivative, and (4) esterifying the hydroxyether group by reacting with a polycarboxylic compound selected from the group consisting of polycarboxylic acids, polycarboxylic acid anhydrides, polycarboxylic acid halides, and mixtures thereof, at least one polycarboxylic compound being ethylenically unsaturated, the resulting polyester resin containing at least one isolated addition-polymerizable carbon-to-carbon double bond.

28. A polymerizable composition of matter comprising an ethylenically unsaturated polyester resin and an ethylenically unsaturated monomer copolymerizable therewith, said unsaturated polyester resin being prepared by the process comprising the steps:

(1) alkylating phenol with an aromatic hydrocarbon having at least one ethylenically unsaturated hydrocarbon substituent to provide a product containing a di-alkylated phenol, (2) reacting the resulting substituted phenols with formaldehyde to form a phenolic condensation product, employing a ratio of up to 0.85 mole of formaldehyde per mole of substituted phenol, (3) reacting the phenolic condensation product with an alkylene oxide to form a hydroxyether derivative, and (4) esterifying the hydroxyether derivative by reacting said derivative in an alkylene glycol with a polycarboxylic compound selected from the group consisting of polycarboxylic acid, polycarboxylic acid anhydrides, polycarbovylic acid halides, and mixtures thereof, at least one polycarboxylic compound being ethylenically unsaturated;

the resulting polyester resin containing at least one isolated addition-polymerizable carbon-to-carbon double bond.

29. The process for producing an unsaturated polyester resin which comprises the steps:

(1) reacting a phenol having the formula:

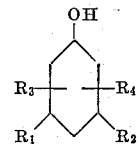

wherein $R_1$ and $R_2$ are each selected from the group consisting of hydrogen, and substantially straight chain aliphatic radicals, $R_3$ is selected from the group consisting of alkyl, alicyclic, aryl and aralkyl groups, and $R_4$ is an aralkyl group, with a compound selected from the group consisting of aldehydes and ketones to form a phenolic condensation product, employing a ratio of up to 0.85 mole of aldehyde or ketone per mole of phenol, (2) reacting the phenolic condensation product with a substance reactive with the phenolic hydroxyl groups thereof, and selected from the group consisting of a monooxirane ring compound, an alkylene halohydrin, an alkylene carbonate, and mixtures thereof to form a hydroxyether derivative, and (3) esterifying the hydroxyether derivative by reacting it with a polycarboxylic compound selected from the group consisting of polycarboxylic acids, polycarboxylic acid anhydrides, polycarboxylic acid halides, and mixtures thereof to produce an unsaturated polyester resin, at least one polycarboxylic compound being ethylenically unsaturated, the resulting polyester resin containing at least one isolated addition-polymerizable carbon-to-carbon double bond.

30. The process for producing an unsaturated polyester resin which comprises the steps:

(1) alkylating phenol with an aromatic hydrocarbon having at least one ethylenically unsaturated hydrocarbon substituent to provide a product containing a di-alkylated phenol, (2) reacting the resulting substituted phenols with formaldehyde to form a phenolic condensation product, employing a ratio of up to 0.85 mole of formaldehyde per mole of substituted phenol, (3) reacting the phenolic condensation product with an alkylene oxide to form a hydroxyether derivative, and (4) esterifying the hydroxyether group by reacting with a polycarboxylic compound selected from the group consisting of polycarboxylic acids, polycarboxylic acid anhydrides, polycarboxylic acid halides, and mixtures thereof, at least one polycarboxylic compound being ethylenically unsaturated, the resulting polyester resin containing at least one isolated addition-polymerizable carbon-to-carbon double bond.

31. A process for producing an unsaturated polyester resin which comprises the steps:
   (1) alkylating phenol with an aromatic hydrocarbon having at least one ethylenically unsaturated hydrocarbon substituent to provide a product containing a di-alkylated phenol,
   (2) reacting the resulting substituted phenols with formaldehyde to form a phenolic condensation product, employing a ratio of up to 0.85 mole of formaldehyde per mole of substituted phenol,
   (3) reacting the phenolic condensation product with an alkylene oxide to form a hydroxyether derivative, and
   (4) esterifying the hydroxyether derivative by reacting said derivative in an alkylene glycol with a polycarboxylic compound selected from the group consisting of polycarboxylic acids, polycarboxylic acid anhydrides, polycarboxylic acid halides, and mixtures thereof, at least one polycarboxylic compound being ethylenically unsaturated, the resulting polyester resin containing at least one isolated addition-polymerizable carbon-to-carbon double bond.

32. The process for preparing a thermoset polymer which comprises the steps:
   (1) reacting a phenol having the formula:

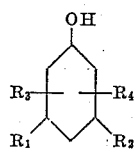

wherein $R_1$ and $R_2$ are each selected from the group consisting of hydrogen, and substantially straight chain aliphatic radicals, $R_3$ is selected from the group consisting of alkyl, alicyclic, aryl and aralkyl groups, and $R_4$ is an aralkyl group, with a compound selected from the group consisting of aldehydes and ketones to form a phenolic condensation product, employing a ratio of up to 0.85 mole of aldehyde or ketone per mole of phenol,
   (2) reacting the phenolic condensation product with a substance reactive with the phenolic hydroxyl groups thereof, and selected from the group consisting of a monooxirane ring compound, an alkylene halohydrin, an alkylene carbonate, and mixtures thereof to form a hydroxyether derivative, and
   (3) esterifying the hydroxyether derivative by reacting it with a polycarboxylic compound selected from the group consisting of polycarboxylic acids, polycarboxylic acid anhydrides, polycarboxylic acid halides, and mixtures thereof to produce an unsaturated polyester resin, at least one polycarboxylic compound being ethylenically unsaturated,
   (4) polymerizing the resulting unsaturated polyester resin in the presence of a catalytic amount of a free radical polymerization catalyst to produce a thermoset polymer.

33. The process for producing a thermoset polymer which comprises the steps:
   (1) alkylating phenol with an aromatic hydrocarbon having at least one ethylenically unsaturated hydrocarbon substituent to provide a product containing a di-alkylated phenol,
   (2) reacting the resulting substituted phenols with formaldehyde to form a phenolic condensation product, employing a ratio of up to 0.85 mole of formaldehyde per mole of substituted phenol,
   (3) reacting the phenolic condensation product with an alkylene oxide to form a hydroxyether derivative, and
   (4) esterifying the hydroxyether group by reacting with a polycarboxylic compound selected from the group consisting of polycarboxylic acids, polycarboxylic acid anhydrides, polycarboxylic acid halides, and mixtures thereof, at least one polycarboxylic compound being ethylenically unsaturated,
   (5) mixing the resulting unsaturated polyester resin with an ethylenically unsaturated monomer copolymerizable therewith, in an amount to produce a thermoset polymer, and
   (6) polymerizing the resulting mixture in the presence of a catalytic amount of a free radical polymerization catalyst to produce a thermoset polymer.

34. The process for producing a thermoset polymer which comprises the steps:
   (1) alkylating phenol with an aromatic hydrocarbon having at least one ethylenically unsaturated hydrocarbon substituent to provide a product containing a di-alkylated phenol,
   (2) reacting the resulting substituted phenols with formaldehyde to form a phenolic condensation product, employing a ratio of up to 0.85 mole of formaldehyde per mole of substituted phenol,
   (3) reacting the phenolic condensation product with an alkylene oxide to form a hydroxyether derivative, and
   (4) esterifying the hydroxyether derivative by reacting said derivative in an alkylene glycol with a polycarboxylic compound selected from the group consisting of polycarboxylic acids, polycarboxylic acid anhydrides, polycarboxylic acid halides, and mixtures thereof, at least one polycarboxylic compound being ethylenically unsaturated,
   (5) mixing the unsaturated polyester resin with an ethylenically unsaturated monomer copolymerizable therewith in an amount to produce a thermoset polymer,
   (6) polymerizing the resulting mixture in the presence of a catalytic amount of a free radical polymerization catalyst to produce a thermoset polymer.

References Cited by the Examiner

UNITED STATES PATENTS 2,610,955  9/1952  De Groote _____ 260—52

MURRAY TILLMAN, *Primary Examiner.*

E. J. TROJNAR, P. LIEBERMAN, *Assistant Examiners.*

UNITED STATES PATENT OFFICE
CERTIFICATE OF CORRECTION

Patent No. 3,283,030                            November 1, 1966

Claude Thomas Bean, Jr., et al.

It is hereby certified that error appears in the above numbered patent requiring correction and that the said Letters Patent should read as corrected below.

Column 3, line 48, for "reatcion" read -- reaction --; column 4, line 30, for "2,4-butylene" read -- 2,3-butylene --; line 40, after "of", second occurrence, insert -- the unsaturated esters with ethylenically unsaturated --; column 6, line 21, for "preparaing" read -- preparing --; line 44, for "ray flock" read -- rayon flock --; column 14, line 20, for "polycarbovylic" read -- polycarboxylic --.

Signed and sealed this 6th day of May 1969.

(SEAL)

Attest:

Edward M. Fletcher, Jr.

Attesting Officer

Commissioner of Patents